US012050840B2

(12) United States Patent
Oja et al.

(10) Patent No.: US 12,050,840 B2
(45) Date of Patent: Jul. 30, 2024

(54) FIRE PANEL AUDIO INTERFACE

(71) Applicant: Tyco Fire & Security Gmbh, Neuhausen am Rheinfall (CH)

(72) Inventors: Gary G. Oja, Worcester, MA (US); Daniel Cianfrocco, Worcester, MA (US); Emma Wang, Milwaukee, WI (US); Deanna M. Johnston, Shrewsbury, MA (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 17/971,289

(22) Filed: Oct. 21, 2022

(65) Prior Publication Data

US 2023/0125575 A1   Apr. 27, 2023

Related U.S. Application Data

(60) Provisional application No. 63/270,894, filed on Oct. 22, 2021.

(51) Int. Cl.
*G06F 3/16* (2006.01)
*G08B 17/00* (2006.01)

(52) U.S. Cl.
CPC .............. *G06F 3/167* (2013.01); *G08B 17/00* (2013.01)

(58) Field of Classification Search
CPC ................................ G06F 3/167; G08B 17/00
See application file for complete search history.

(56) References Cited

U.S. PATENT DOCUMENTS

| 2005/0231349 | A1* | 10/2005 | Bhat | G08B 25/08 |
| | | | | 340/506 |
| 2017/0076585 | A1* | 3/2017 | El-Mankabady | G08B 27/006 |
| 2019/0066464 | A1* | 2/2019 | Wedig | G08B 27/001 |

OTHER PUBLICATIONS

And Farenhyt ECS (emergency communications system) line from silent knight ("Farenhyt") https://www.securityinfowatch.com/alarms-monitoring/fire-life-safety/fire-alarm-panels/product/10655429/honeywell-silent-knight-farenhyt-ecs-emergency-communications-system-line-from-silent-knight Mar. 13, 2012 (Year: 2012).*

(Continued)

*Primary Examiner* — Sherrod L Keaton
(74) *Attorney, Agent, or Firm* — ARENTFOX SCHIFF LLP (57) ABSTRACT

A fire alarm control panel (FACP) in a fire alarm system includes a processor in communication with a communications interface. The processor is configured to receive an event signal from an initiation device. The FACP also includes a display, controlled by the processor, indicating a status of the fire alarm system and configured to present a plurality of icons corresponding to a plurality of voice messages to be selectively played in response to receiving one or more event signals from the initiation device. The FACP further includes an embedded microphone mounted in the fire alarm control panel adjacent to the display. The FACP also includes a programmable microphone interface controlled by the processor, in communication with the embedded microphone utilized in response to receiving one or more event signals from the initiation device.

20 Claims, 6 Drawing Sheets

(56) References Cited

OTHER PUBLICATIONS

"Silent Knight Addressable Fire Alarm System 6820EVS and EVS-LOC and 6860 Remote Annunciator" https://www.youtube.com/watch?v=VZEdDzjC4cs (Year: 2020).*

Farenhyt ECS (emergency communications system) line from silent knight ("Farenhyt") https://www.securityinfowatch.com/alarms-monitoring/fire-life-safety/fire-alarm- panels/product/10655429/honeywell-silent-knight-farenhyt-ecs-emergency-communications-system-line-from-silent-knight (Year: 2012).*

\* cited by examiner

FIRE PANEL AUDIO INTERFACE

CLAIM OF PRIORITY

The present application claims priority to U.S. Provisional Application No. 63/270,894 filed Oct. 22, 2021, which is assigned to the assignee hereof and incorporated by reference herein.

FIELD

The present disclosure relates generally to a fire-alarm control panel. More particularly, the present disclosure relates to audio interface of the fire-alarm control panel.

BACKGROUND

Existing small fire alarm panels today may enable an operator to specify custom message (either pre-stored or by capturing live voice) to be played. However, this is typically done by requiring a second audio panel to be configured and installed in addition to the main fire panel. Additionally, the fire panel may also send a signal to a fire department or fire brigade, a central receiving station, local monitoring stations, and/or other building alarm/notification systems (e.g., public address systems). The operator may speak the live message into a handheld microphone associated with a separate hardware panel, or may pre-record some audible messages.

However, the aforementioned legacy systems require installation and configuration of a plurality of fire panels. If more message selections are required, additional hardware may be needed to support the corresponding switches and LEDs and additional labels may be needed. When the handheld microphone is used, the operator does not know the quality of the message. Improving intelligibility of the message may be critical in emergency life safety situations.

Therefore, there is still a need in the art to improve the functionality and efficiency of fire alarm panels.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example aspect includes a fire alarm control panel (FACP) in a fire alarm system that includes a communications interface for communicating with one or more notification appliances. The FACP further includes a processor in communication with the communications interface. The processor is configured to receive an event signal from an initiation device. The FACP also includes a display, controlled by the processor, indicating a status of the fire alarm system and configured to present a plurality of icons corresponding to a plurality of voice messages to be selectively played in response to receiving one or more event signals from the initiation device. The FACP further includes an embedded microphone mounted in the fire alarm control panel adjacent to the display. The FACP also includes a programmable microphone interface controlled by the processor, in communication with the embedded microphone, utilized in response to receiving one or more event signals from the initiation device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, wherein dashed lines may indicate optional elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

For example, in one implementation, which should not be construed as limiting, a multifaceted integrated design of a fire panel provides solutions to the aforementioned drawbacks of conventional fire panels. First, the fire alarm functionality and the audio/mass notification/voice control functionality are integrated into a single panel. In an example, the more advanced panel may provide much of the functionality required to support many smaller sized facilities who may desire this advanced capability or require this functionality due to new fire code requirements. Additionally, a microphone including one or more transducers positioned in one or more housings may be integrated into the front panel, reducing the footprint required as compared to installation of a separate handheld microphone.

Second, the GUI (Graphical User Interface) may provide an interactive display of a virtual LED/switch annunciator on a display of a fire alarm interface. This specialized instruction set provides a greater degree of flexibility since additional hardware is not required to expand user selections of recorded messages. Still another aspect of the present disclosure is to provide these advantages by adding more virtual buttons to the display corresponding to various pre-recorded messages, if additional pre-recorded messages are required. Advantageously, the disclosed configuration of a fire panel helps to achieve actual cost reductions/savings.

An example of fire alarm control panel GUI is described below. Thus, the present disclosure provides a fire alarm control panel with a multifaceted integrated design.

Figure 1:
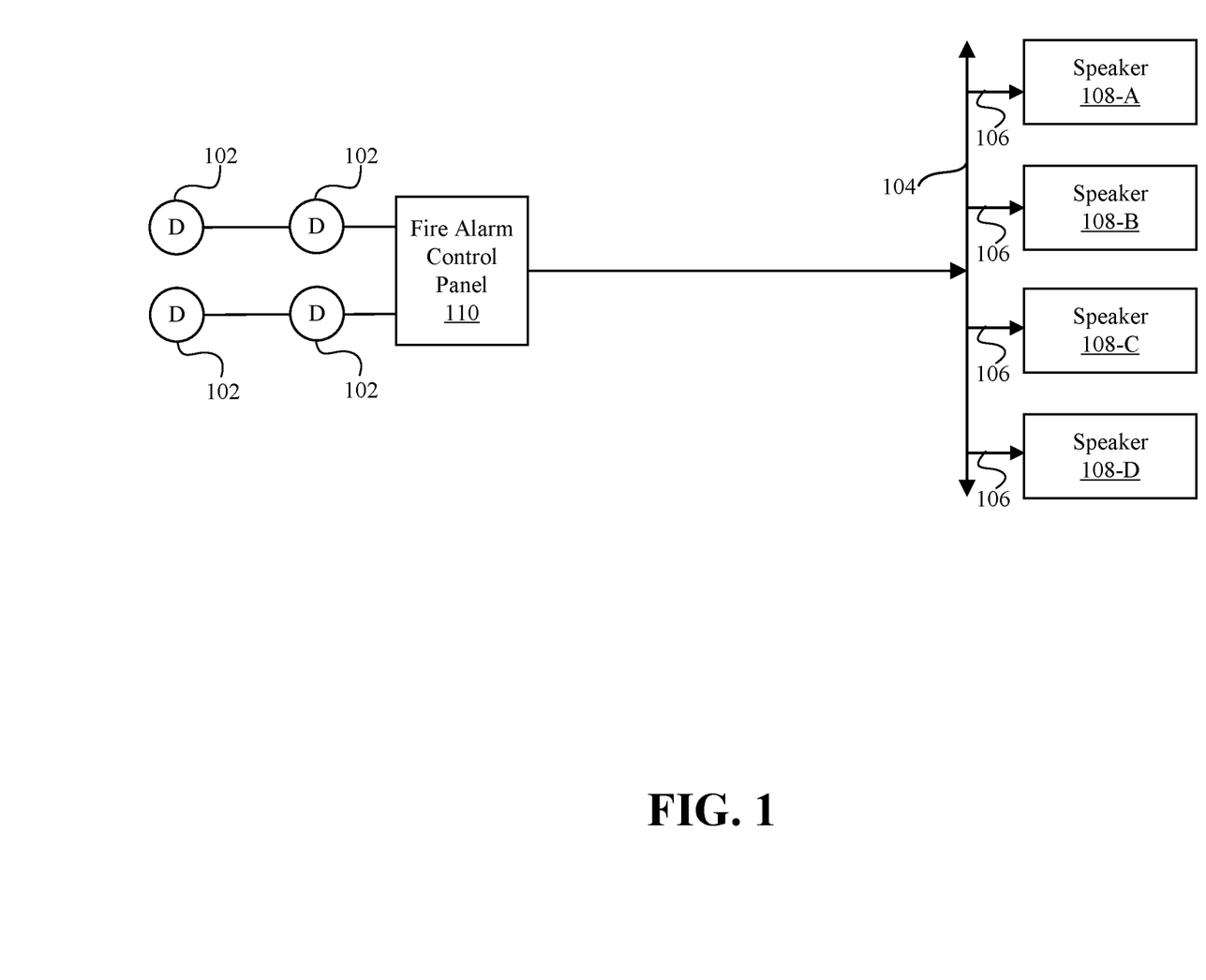
FIG. 1 is a block diagram illustrating the details of a fire alarm system provided in accordance with aspects of the present disclosure.

FIG. 1 is a block diagram illustrating the details of a fire alarm system 100 provided according to an aspect of the present disclosure. The block diagram is shown containing fire alarm control panel (FACP) 110, detectors (and/or initiation devices) 102, and speakers (and/or notification appliances) 108.

Though not illustrated in FIG. 1, broadly, detectors 102 (e.g., smoke detector, heat detector, gas detector, water detector) may be placed in different locations where it is desirable to detect a hazardous event. Speaker units 108 may be placed in locations where it would be desirable to play a voice warning message and/or instructions and/or alarms sounds (e.g., horn). Control modules and audio transponders may be placed close to corresponding speaker units 108. FACPs 110 may be located at places where the various wires (communication mediums) terminate.

Each detector 102 may be configured to detect a hazardous situation (or any undesirable situation for which the detector is designed) in the surrounding area, and may send an alarm signal if/when such a situation is detected/suspected. In general, each detector 102 may have a unique identifier based on its specific location, and the hazardous situation may be determined at the FACP 110 based on the type of detector 102 that sent the alarm signal. The detectors 102 may be connected to a corresponding FACP 110 by a loop structure (using protocols such as ARCnet, or any other similar protocol).

Speakers 108 are connected to network 104, and may be individually addressable according to the network protocol used on the network. In an aspect, each speaker 108 may be addressable using a corresponding IP (Internet Protocol) address. Each speaker 108 may receive a voice message ("live message") to be played using VoIP ("Voice over Internet Protocol"), and may play the corresponding message. Each speaker 108 may further receive control messages, which may indicate operations such as increasing the volume, playing a pre-stored message, etc. Alternatively, or in addition, each speaker 108 may receive one or more other alarm messages and correspondingly may generate alarm sounds (e.g., horns, beeps). In some cases, an alarm message may include a voice message, or vice versa.

FACP 110 may receive various alarms from detectors 102, and may provide a suitable interface for an operator to view the corresponding information. In addition, the FACP 110 may enable an operator to specify custom messages (either pre-stored or by capturing live voice) to be played on each speaker 108.

As each speaker 108 may be individually addressable, different messages may be sent to different speakers 108. In addition, an operator may dynamically (in real-time or impromptu) generate messages, which may be played on any one or any selected combination of the speakers 108, e.g., any speakers 108 located in an area where the message is applicable. As a result, an operator may have enhanced operational control during any type of emergency event, such as but not limited to an evacuation of a building in which the fire alarm system 100 is installed. The description is continued with reference to the details of an example GUI interface of the FACP 110.

Figure 2:
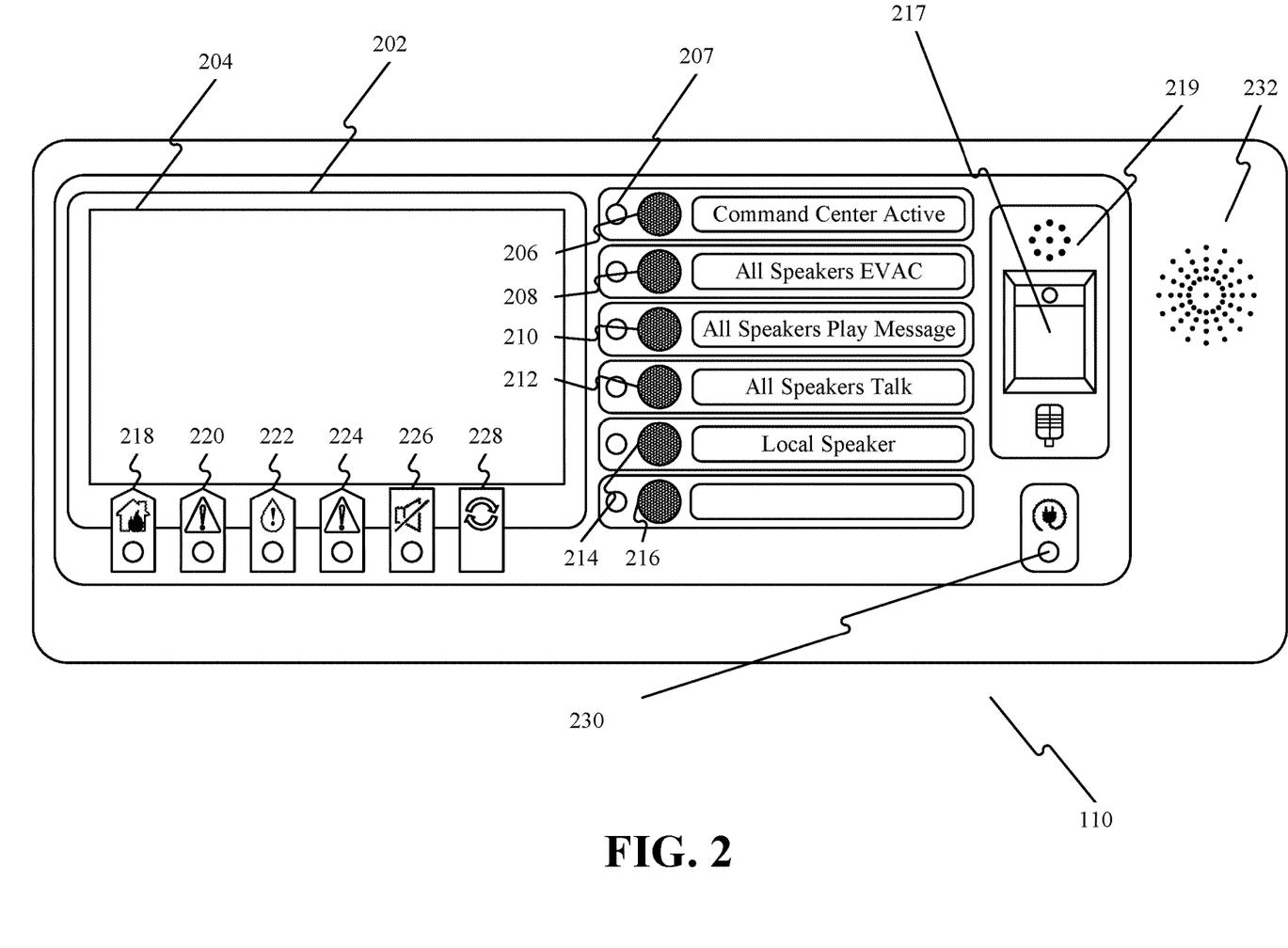
FIG. 2 is a block diagram of an example fire panel provided in accordance with aspects of the present disclosure.

FIG. 2 is a block diagram of an example fire panel 110 including a multi-functional GUI 204 and a built-in (embedded) microphone 219, in accordance with aspects of the present disclosure. In an implementation, the microphone 219 may be integrated directly into a housing of the FACP 110, within one or more openings on a front panel of the FACP 110 to allow the microphone to receive audio signals. The microphone 219 may be used as an input device for receiving an audio signal and may provide the signal to a processing module/processor of the FACP 110 that may convert the signal into a digital signal. In addition to the microphone 219, the FACP 110 may include a video display 202 having GUI 204, and a software based button panel 206-216. Advantageously, the button panel 206-216 replaces conventional panel of switches. The software based button panel 206-216 includes a plurality of programmable buttons that each may be associated with a particular voice or alarm message and/or with a particular set of speakers 108. For instance, an operator may program the button panel to include or add any voice message and/or a set of voice messages and/or alarm messages, and one or more speakers 108 associated with the outputting of the corresponding message. The GUI 204 of the display 202 may be used by an operator to generate and/or select a message they want to play. As noted above, in addition to having pre-recorded voice messages, the operator may make live voice messages. Additionally, the FACP 110 may include a visual indicator 230 of the current state being on or off. For example, the visual indicator 230 in the form of one green LED may indicate AC power present and may indicate no AC power when the visual indicator 230 is off. Moreover, the FACP 110 may include an integrated speaker 232 to enable an operate to hear the message being output by the FACP 110 and/or a quality of a message being recorded.

Each button 206-216 may be associated with a corresponding LED indicator 207. Visual feedback that a button 206-216 is pressed may be provided to the user by turning on an LED indicator 207 when a corresponding button 206-216 is pressed. Advantageously, since the button panel is software based, it is easy to expand. In other words, there is no requirement for a technician to come and add more LED indicators 207 and/or switches to the panel. The specific functionality of one example implementation of the set of buttons 206-216 is discussed in detail below with reference to FIG. 3. Furthermore, typical fire panels include one or more external microphones that work to transmit a voice signal of a near end user (operator) to the speakers 108. In contrast, in an aspect of the present disclosure, the microphone 219 is embedded into the FACP 110. The microphone 219 may be controlled by a processor of the FACP 110. As shown in FIG. 2, the microphone 219 may be mounted on the electronic assembly of the FACP 110. In an aspect, the microphone 219 may be mounted to protrude from the face of the FACP to increase its exposure to the surrounding environment.

In an aspect, the button that used to be in the operator's hand when they held the external microphone may now be integrated into the FACP 110. In one implementation, for example, the fire panel 110 may include a Push To Talk (PTT) button 217 on the front panel, adjacent to the microphone 219, and/or may include a soft virtual button as part of the GUI 204 presented on the display 202. In an aspect, the display 202 may present instructions to an operator on how to use the hands-free embedded microphone 219. The hands-free microphone 219 allows a user to use voice messages without handling a separate, external microphone. In addition to instructions on how to use the embedded microphone 219 (shown in FIG. 4), the display 212 may also provide visual feedback when the PTT button 217 is pressed (as shown in FIG. 5). Advantageously, the visual feedback may improve intelligibility of the recorded message consistent with aspects of the disclosure. For example, the visual feedback may indicate that an operator is too far away from the FACP 110, too close to the FACP 110, and the like. The recorded message may be saved and then played back.

In an aspect, the embedded microphone 219 may include a microphone circuit used in an active noise cancellation system. In other words, the integrated microphone 219 may be an active noise cancellation apparatus and active noise reduction apparatus which may be configured to reduce background noise to an acceptable level, e.g., to achieve a predetermined voice to noise ratio corresponding to a verbal message that is clear and understandable. In an aspect, when speech is detected by the integrated microphone 219, the microphone interface may generate a control signal. The control signal may be used to activate, adjust, or control signal separation processes or post-processing operations to improve the quality of the resulting speech signal. In an aspect, the embedded microphone 219 may include a discriminator, an amplitude circuit and a filtering circuit. In operation, the discriminator may determine the duration of the input signal. When the duration is greater than a time threshold, the discriminator may inform the amplitude circuit. The amplitude circuit may determine the amplitude of the input signal, when the duration of input is greater than the time threshold. A control amplitude signal representative of the amplitude of the input signal may be used as an input to the filtering circuit. The filtering circuit may be configured to filter the noise, or other undesirable signal portion, from the input signal with the amount of filtering performed according to the control amplitude.

In an aspect, a programmable microphone interface of the embedded microphone 219, controlled by the processor of the FACP 110, may include software enabling speech recognition, for example, to enable voice control to activate one or more functions of the FACP 110 described herein. In an aspect, the software enabling speech recognition may be communicatively coupled to one or more remote speech recognition servers. The processor may be configured to process speech (e.g., voice commands) received via the microphone interface, and respond to the detected speech by causing the FACP 110 to perform one or more requested actions. For example, the processor may be configured to reset the FACP 110, in response to receiving the one or more generated voice commands from an operator. In an aspect, an operator may perform one or more diagnostic actions using one or more voice commands. Furthermore, the one or more generated voice commands may include an event acknowledgement from a user. The processor may be configured to process the received event acknowledgement by automatically sending a control command to silence one or more notification appliances.

Advantageously, the fire panel shown in FIG. 2 may be used not only in large structures but also in a room or space used for assembly purposes with an occupant load of more than 50 persons. The disclosed fire panel may be used for delivery of pages, voice messages and announcements indicating what kind of emergency is happening, for example, instead of the typical blaring horn sound. It should be noted that small structures may be more cost sensitive, as compared to large buildings, for example. The disclosed solution may reduce the cost of a fire alarm panel by eliminating the cost of the handheld microphone and other hardware components. In addition, the disclosed FACP 110 may enable operators to selectively page certain speakers 108 or certain circuits of speakers 108, and to dynamically configure the FACP 110.

Further, the FACP 110 may also include fire event buttons 218-228. Different fire events may have different priority. In an aspect, the fire event buttons 218-228 may be standard buttons used in the fire alarm industry to reset any hardware associated with the detected fire (or other emergency event). Buttons 218-224 may indicate four different classes of fire events. For example, one of the events could be a carbon monoxide event. In an aspect, an operator may acknowledge a particular fire event by pressing a corresponding button 218-222. In an aspect, an operator may acknowledge a fire event by pressing button 218. In an aspect, an operator may acknowledge a carbon monoxide/priority 2 event by pressing button 220. In an aspect, an operator may acknowledge a supervisory event by pressing button 222. In an aspect, an operator may acknowledge a trouble event by pressing button 224. In an aspect, an operator may cancel the noise generated by notification appliances by pressing button 226. In an aspect, an operator may perform a hardware rest of the FACP 110 by pressing button 228.

Figure 3:
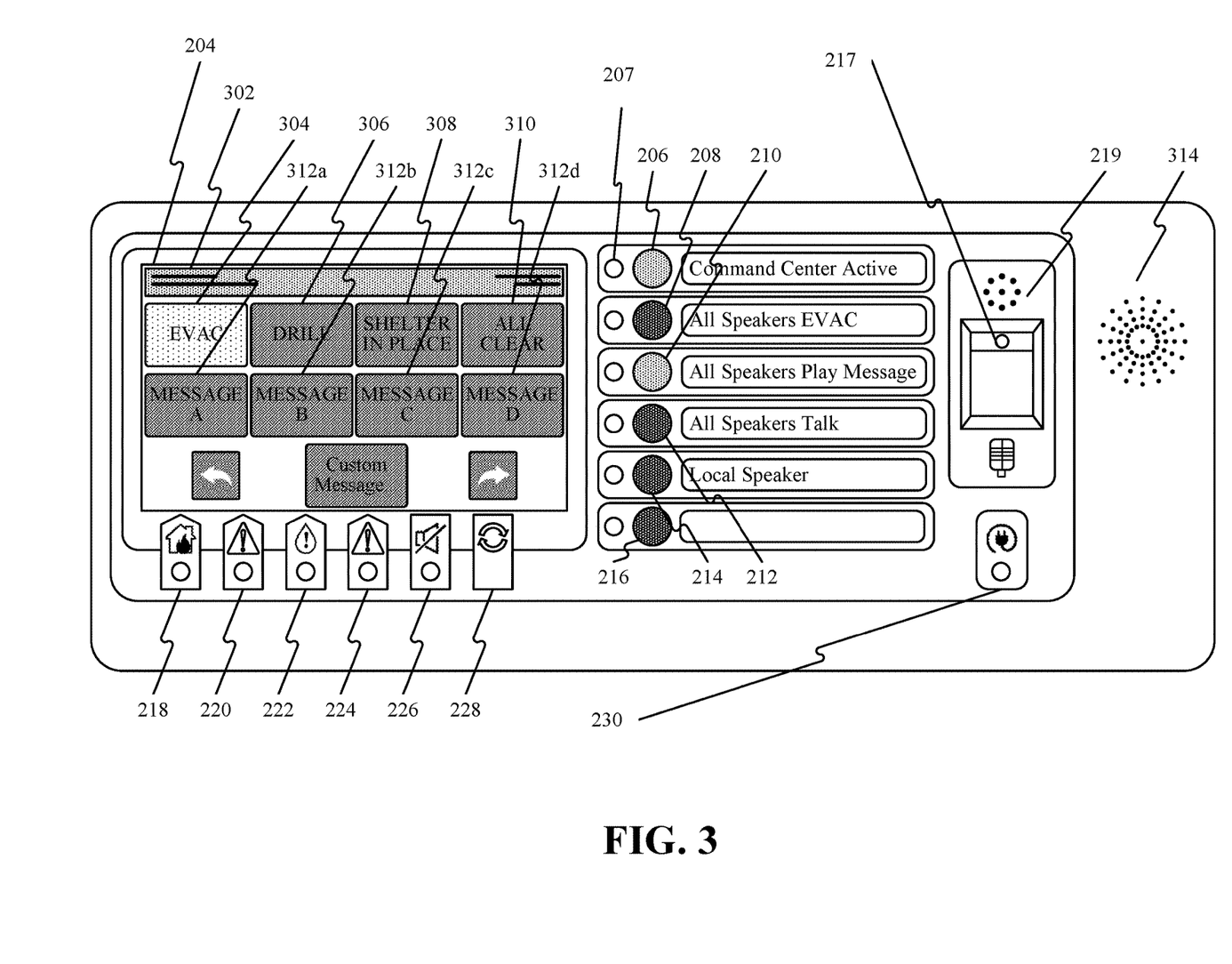
FIG. 3 is a block diagram of example virtual switches and LEDs provided by the fire panel audio interface in accordance with aspects of the present disclosure.

FIG. 3 is a block diagram of example virtual switches and LEDs provided by the fire panel audio interface in accordance with aspects of the present disclosure. In an aspect, the button panel 206-216 may include a set of preprogrammed soft buttons configured to perform corresponding audio related functions. In an aspect, a first button 206 may be a control button. For example, if the alarm system illustrated in FIG. 1 includes more than one FACP 110, by pressing the first button 206, e.g., a Command Center Active button, an operator may request control from other FACPs 110. A first LED indicator 207 may indicate that the FACP 110 has control when that LED indicator 207 is on. In an aspect, if the security system has only one FACP 110, the first LED indicator 207 may be turned on essentially constantly.

In an aspect, the second button 208, e.g., the All Speakers EVAC button, may be used to play a pre-recorded audio message, e.g., indicating evacuation, on all speakers 108 (or speakers 108 within a particular zone of the structure). The evacuation audio message may indicate that a hazardous environmental condition and/or other dangerous event has been sensed and/or reported in the immediate area and that occupants of the structure monitored by the FACP 110 should evacuate the structure. For example, such message may indicate that a fire alarm has been detected. Furthermore, the audio message played in response to pressing the second button 208 may guide people to move towards a nearest exit.

In an aspect, the third button 210, e.g., the All Speakers Play Message button, may be used to play any selected (e.g., via GUI 204) pre-recorded audio message on all speakers 108 (or any set of one or more selected speakers 108 within one or more particular zones of the structure).

In an aspect, the fourth button 212, e.g., the All Speakers Talk button, may be used for an operator to speak a live message into the microphone 219 to be played on all speakers 108 (or any set of one or more selected speakers 108 within one or more particular zones of the structure).

It should be noted that an operator may select to be played a particular prerecorded message via one or more virtual buttons 304-310 rendered on the display 202. In response to an operator pressing a corresponding button 206-214, the respective message may be played on one or more speakers 108, e.g., such as may be configured via buttons 206-214. For example, pre-recorded messages may include but are not limited to an evacuation message, a message that the alarm condition is a drill and not a live emergency, a message to shelter in place, a message that the emergency event is over and it is safe (e.g., all clear), a weather warning message event (for example, an approaching tornado), an active shooter message, and the like In addition, an operator is able to create a custom message using the embedded microphone 219, if the desired message does not appear on the display 202. FIG. 3 illustrates multiple examples of messages 304-310 that may be shown by the display 202, in response to an operator pressing the first button 206. For example, in case of real evacuation the operator may select a first message 304 to be played, in case of a fire drill, the operator may select a second message 306 to be played by the FACP 110. In addition, the FACP 110 shown in FIG. 3 may enable the operator to play live messages by capturing the voice of the operator using the embedded microphone 219 and forwarding the voice in the form of audio/voice data to speakers 108. Protocols such as H.323 may be supported on both speakers 108 and the FACP 110 such that control data can be sent from the FACP 110 to the speakers 108.

Virtual message buttons 312a-312d (Message A, B, C, and D, respectively) represent configurable and re-nameable virtual buttons for messages that can be dynamically recorded by an operator. If there are more selectable messages than can be presented on the display 202 simultaneously, an operator may navigate the message menu using arrows 316a and 316b.

As mentioned above, the FACP 110 may also include a local speaker 232 In an aspect, an operator may be interested to play a particular message, such as one of the messages 312a-312d, on the local speaker 232, such as by pressing the fifth button 214, e.g., the Local Speaker button. In some implementations, such as to allow the operator to verify what message is being played by the remote speakers 108, the selected message may be played by the local speaker 232 simultaneously with the selected message playing on the remote speakers 108.

As noted above, various messages may be recorded using the embedded microphone 219 using the PTT button 217 to control when audio is recorded. Advantageously, an operator can begin speaking immediately after pressing the PTT button 217, or after some convenient delay, such as, for example, one second. As discussed in more detail below with respect to FIG. 5, the FACP 110 may utilize the GUI of the display, in combination with the PTT button 217 and integrated microphone 219, to provide feedback to an operator as to a quality of a live audio message and/or an audio message being recorded for subsequent playback.

Figure 4:
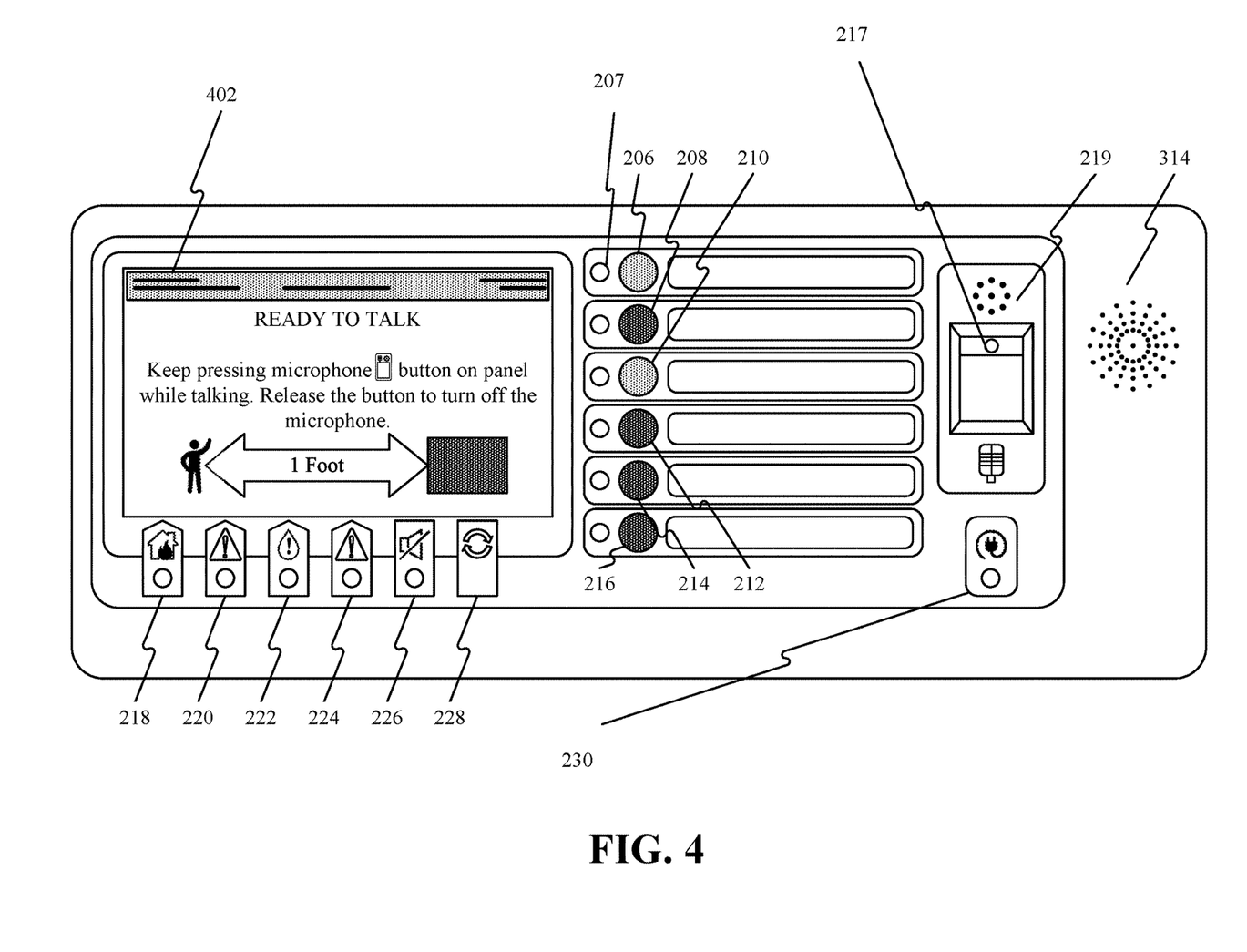
FIG. 4 is a block diagram illustrating example instructions presented to an operator in accordance with aspects of the present invention.
Figure 5:
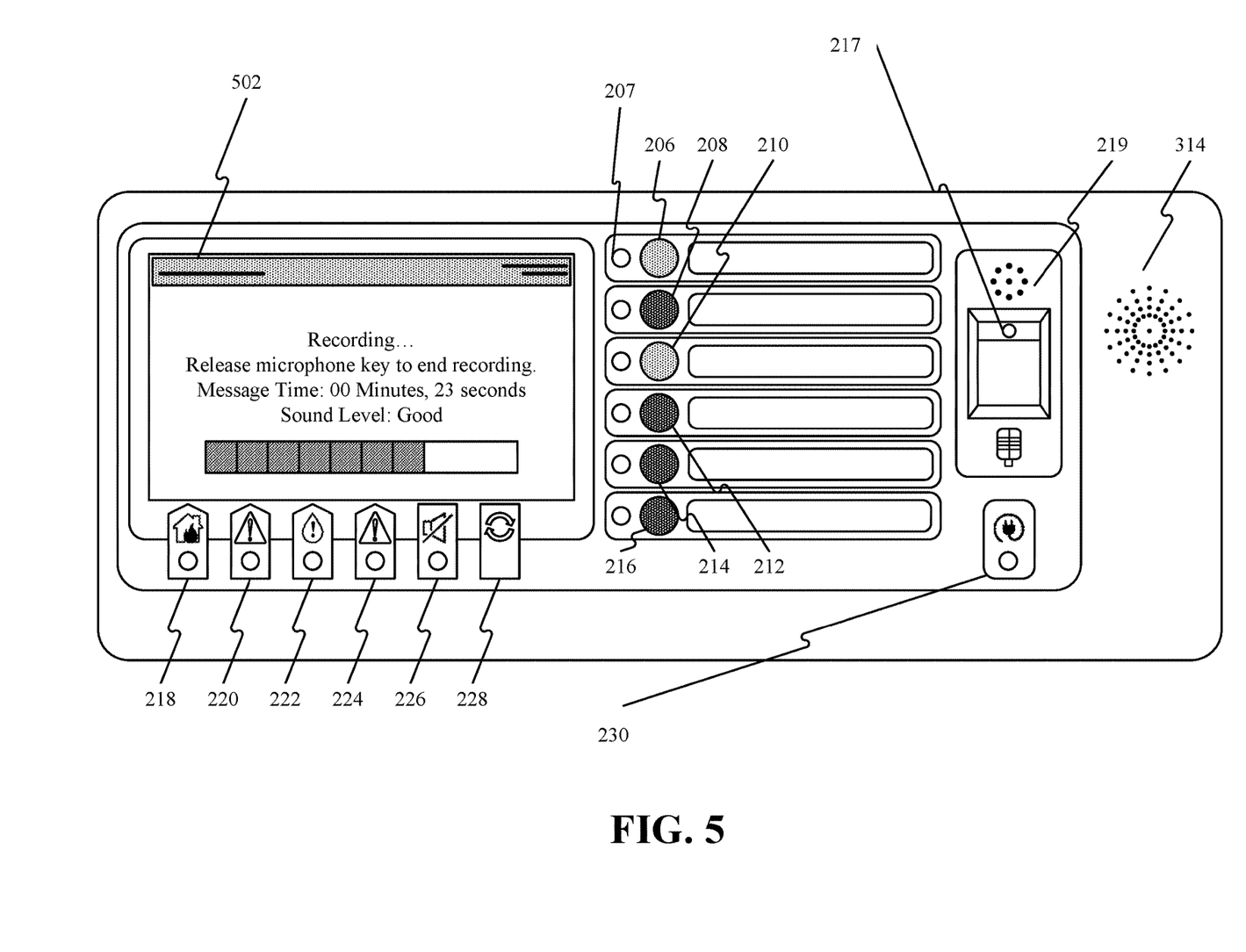
FIG. 5 is a block diagram illustrating example visual real-time feedback during message recording in accordance with aspects of the present invention.

FIG. 4 is a block diagram illustrating example GUI 402 include instructions presented to an operator in accordance with aspects of the present invention. In a non-limiting example, the instructions presented via the GUI 402 may explain to an operator how to use the embedded microphone 219.

FIG. 5 is a block diagram illustrating example visual real-time feedback that may be presented to an operator during a live message, and/or during message recording, in accordance with aspects of the present disclosure. As noted above, when the operator is announcing a live message or recording a message for playback at a later time, real-time background noise filtering and voice processing may be applied by the embedded microphone 219. In an aspect, the GUI of the FACP 110 via present a feedback message 502 that continually indicates the volume of the recording to enable the operator make adjustments in voice amplitude and/or quality to improve the intelligibility of the message. If a custom voice message is being recorded, the length of the voice recording may also be shown and updated in real-time in the feedback message 502.

In other words, the FACP 110 in the fire alarm system 100 includes a communications interface for communicating with one or more notification appliances. The FACP further includes a processor in communication with the communications interface. The processor is configured to receive an event signal from an initiation device. The FACP also includes a display, controlled by the processor, indicating a status of the fire alarm system and configured to present a plurality of icons corresponding to a plurality of voice messages to be selectively played in response to receiving one or more event signals from the initiation device. The FACP further includes an embedded microphone mounted in the fire alarm control panel adjacent to the display. The FACP also includes a programmable microphone interface controlled by the processor, in communication with the embedded microphone, utilized in response to receiving one or more event signals from the initiation device.

In an alternative or additional aspect, the one or more notification appliances include one or more individually addressable speakers.

In an alternative or additional aspect, the display is further configured to display user instructions on how to use the embedded microphone.

In an alternative or additional aspect, the display is further configured to display visual feedback during a live message announcement.

In an alternative or additional aspect, the visual feedback includes a volume of the live message announcement.

In an alternative or additional aspect, the processor is configured to record a message and configured to transmit the recorded message to the communication interface.

In an alternative or additional aspect, the display is further configured to display visual feedback during message recording.

In an alternative or additional aspect, the visual feedback includes duration of the recorded message and/or a volume of audio received for the recorded message.

In an alternative or additional aspect, the processor is configured to process speech recognition commands.

In an alternative or additional aspect, the processor is configured to reset the fire alarm control panel, in response to receiving the one or more generated voice commands.

In an alternative or additional aspect, the one or more generated voice commands comprise an event acknowledgement from a user and wherein the processor is configured to process the received even acknowledgement by automatically sending a control command to silence one or more notification appliances.

Figure 6:
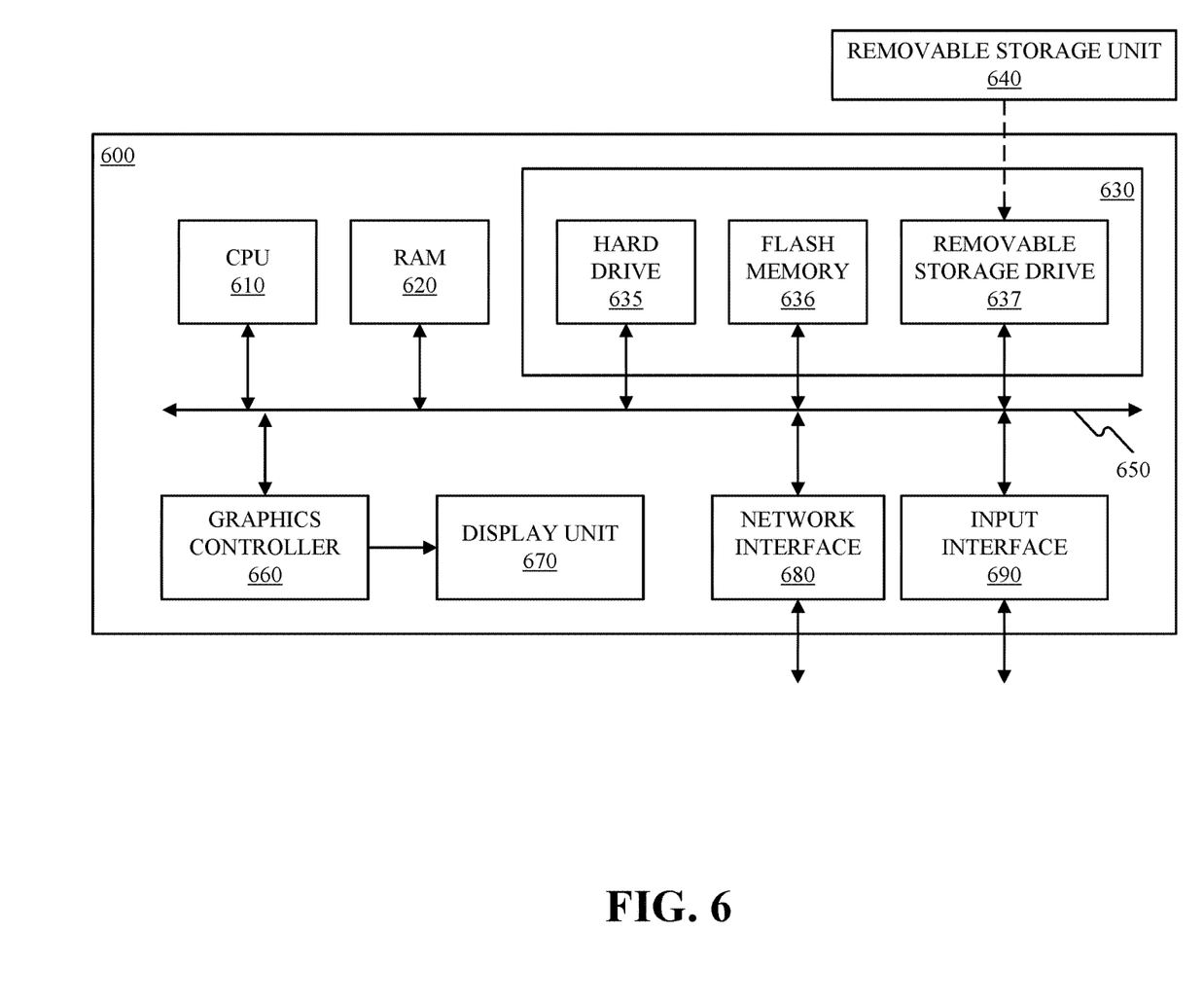
FIG. 6 is a block diagram of various hardware components and other features of an example fire panel which is controlled by software instructions to provide several features in accordance with aspects of the present disclosure.

FIG. 6 is a block diagram of various hardware components and other features of an example FACP 110 which is controlled by software instructions to provide several features in accordance with aspects of the present disclosure. FACP 110 may contain one or more processors such as central processing unit (CPU) 610, random access memory (RAM) 620, secondary memory 630, graphics controller 660, display unit 670, network interface 680, and input interface 690. All the components except display unit 670 may communicate with each other over communication path 650, which may contain several buses as is well known in the relevant arts. The components of FIG. 6 are described below in further detail.

CPU 610 may execute instructions stored in RAM 620 to provide several features of the present invention. CPU 610 may contain multiple processing units, with each processing unit potentially being designed for a specific task. Alternatively, CPU 610 may contain only a single general purpose processing unit.

RAM 620 may receive instructions from secondary memory 630 using communication path 650. The instructions may implement one or more of the various user applications, access module, procedures, etc., described above.

Graphics controller 660 generates display signals (e.g., in RGB format) to display unit 670 based on data/instructions received from CPU 610. Display unit 670 contains a display screen to display the images defined by the display signals. Input interface 690 may correspond to a keyboard and/or mouse. Graphics controller 660, display unit 670, and input interface 690 together provide a suitable user interface using which an operator may control evacuation procedures using different features provided by various aspects of the present disclosure.

Secondary memory 630 may contain hard drive 635, flash memory 636 and removable storage drive 637. Secondary memory 630 may store the data and software instructions, which enable FACP 110 to provide several features in accordance with the present disclosure. Some or all of the data and instructions may be provided on removable storage unit 640, and the data and instructions may be read and provided by removable storage drive 637 to CPU 610. Flash memory, removable memory chip (USB memory drive, microSD card) are examples of such removable storage drive 637.

Removable storage unit 640 may be implemented using medium and storage format compatible with removable storage drive 637 such that removable storage drive 637 can read the data and instructions. Thus, removable storage unit 640 includes a computer readable storage medium having stored therein computer software and/or data.

In this document, the term "computer program product" is used to generally refer to removable storage unit 640 or hard disk installed in hard drive 635. These computer program products are means for providing software to FACP 110. CPU 610 may retrieve the software instructions, and execute the instructions to provide various features of the present disclosure as described above.

The aspects of the disclosure discussed herein may also be described and implemented in the context of computer-readable storage medium storing computer-executable instructions. Computer-readable storage media includes computer storage media and communication media. For example, microSD card, CompactFlash and USB memory drives. Computer-readable storage media may include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A fire alarm control panel (FACP) in a fire alarm system, comprising:
   a communications interface for communicating with one or more fire alarm notification appliances;
   a processor in communication with the communications interface, the processor configured to receive an event signal from a fire alarm initiation device that is configured on a wire loop structure that terminates at the FACP;
   a display, controlled by the processor, indicating a status of the fire alarm system and configured to present a graphical user interface (GUI) comprising a plurality of voice message icons corresponding to a plurality of voice messages to be selectively played in response to receiving one or more event signals from the fire alarm initiation device;
   an embedded hands-free microphone integrated within the FACP and provided adjacent to the display of the FACP, wherein the embedded hands-free microphone is configured in a same hardware panel housing as the FACP that terminates the wire loop structure on which the fire alarm initiation device is configured; and
   a programmable microphone interface, controlled by the processor, in communication with the embedded hands-free microphone, utilized in response to receiving the one or more event signals from the fire alarm initiation device.

2. The FACP of claim 1, wherein the one or more fire alarm notification appliances comprise one or more individually addressable speakers.

3. The FACP of claim 1, wherein the display is further configured to display user instructions on how to use the embedded hands-free microphone.

4. The FACP of claim 1, wherein the display is further configured to display visual feedback during a live message announcement.

5. The FACP of claim 4, wherein the visual feedback includes a volume of the live message announcement.

6. The FACP of claim 1, wherein the processor is configured to:
   record a message; and
   transmit the message to the communications interface.

7. The FACP of claim 6, wherein the display is further configured to display visual feedback during message recording.

8. The FACP of claim 7, wherein the visual feedback includes duration of the message and/or a volume of audio received for the message.

9. The FACP of claim 6, wherein the message comprises one or more voice commands, wherein the processor is configured to process the one or more voice commands.

10. The FACP of claim 9, wherein the processor is configured to reset the FACP, in response to receiving the one or more voice commands.

11. The FACP of claim 9, wherein the one or more voice commands comprise an event acknowledgement from a user and wherein the processor is configured to process the event acknowledgement by automatically sending a control command to silence the one or more fire alarm notification appliances.

12. The FACP of claim 1, wherein the fire alarm initiation device is connected to the FACP by the wire loop structure using the ARCnet protocol.

13. A non-transitory computer readable medium of a fire alarm control panel (FACP) in a fire alarm system, the non-transitory computer readable medium storing thereon computer executable instructions for communicating with one or more fire alarm notification appliances, including instructions for:

providing a programmable microphone interface in communication with an embedded hands-free microphone integrated within the FACP and adjacent to a display of the FACP, wherein a fire alarm initiation device is configured on a wire loop structure that terminates at the FACP, wherein the embedded hands-free microphone is configured in a same hardware panel housing as the FACP that terminates the wire loop structure on which the fire alarm initiation device is configured;

generating one or more voice commands using the embedded hands-free microphone;

wherein the FACP further comprises:
    a communications interface for communicating with the one or more fire alarm notification appliances; and
    a processor in communication with the communications interface, the processor configured to receive an event signal from the fire alarm initiation device;

wherein the display, controlled by the processor, indicates a status of the fire alarm system and configured to present a graphical user interface (GUI) comprising a plurality of voice message icons corresponding to a plurality of voice messages to be selectively played in response to receiving one or more event signals from the fire alarm initiation device; and wherein the programmable microphone interface, controlled by the processor, is utilized in response to receiving the one or more event signals from the fire alarm initiation device.

14. The non-transitory computer readable medium of claim 13, further comprising instructions for presenting user instructions on how to use the embedded hands-free microphone on the display of the FACP.

15. The non-transitory computer readable medium of claim 14, wherein the display is further configured to display visual feedback during a live message announcement, wherein the visual feedback includes a volume of the live message announcement.

16. The non-transitory computer readable medium of claim 13, further comprising instructions for providing visual feedback during message recording on the display of the FACP.

17. The non-transitory computer readable medium of claim 16, wherein the visual feedback includes duration of a recorded message and/or a volume of audio received for the recorded message.

18. The non-transitory computer readable medium of claim 13, further comprising instructions for processing the one or more voice commands.

19. The non-transitory computer readable medium of claim 18, wherein the instructions for processing the one or more voice commands further comprise instructions for resetting the FACP.

20. The non-transitory computer readable medium of claim 18, wherein the one or more voice commands comprise an event acknowledgement from a user and wherein the instructions further comprise instructions for processing the event acknowledgement by automatically sending a control command to silence the one or more fire alarm notification appliances.

* * * * *